W. M. CRANE.
BEATER.
APPLICATION FILED AUG. 2, 1919.

1,325,509.

Patented Dec. 23, 1919.

Inventor
William Monroe Crane

By John W. Darley
Attorney

UNITED STATES PATENT OFFICE.

WILLIAM MONROE CRANE, OF BALTIMORE, MARYLAND, ASSIGNOR OF ONE-HALF TO J. FRANK FOX, OF BALTIMORE, MARYLAND.

BEATER.

1,325,509.  Specification of Letters Patent.  Patented Dec. 23, 1919.

Application filed August 2, 1919.  Serial No. 314,920.

*To all whom it may concern:*

Be it known that I, WILLIAM MONROE CRANE, a citizen of the United States, residing at Baltimore, in the State of Maryland, have invented certain new and useful Improvements in Beaters; and I do hereby declare the following to be a full, clear, and exact description of the invention, such as will enable others skilled in the art to which it appertains to make and use the same.

My invention relates to beaters for use in beating eggs, whipped cream or any other substance, or combinations of substances which it is desired to change to a foamy consistency.

I attain this result by agitating the eggs or other substances and at the same time forcing air through the body thereof.

In carrying out my invention I make use of the instrumentalities illustrated in the accompanying drawings in which:—

Figure 1:
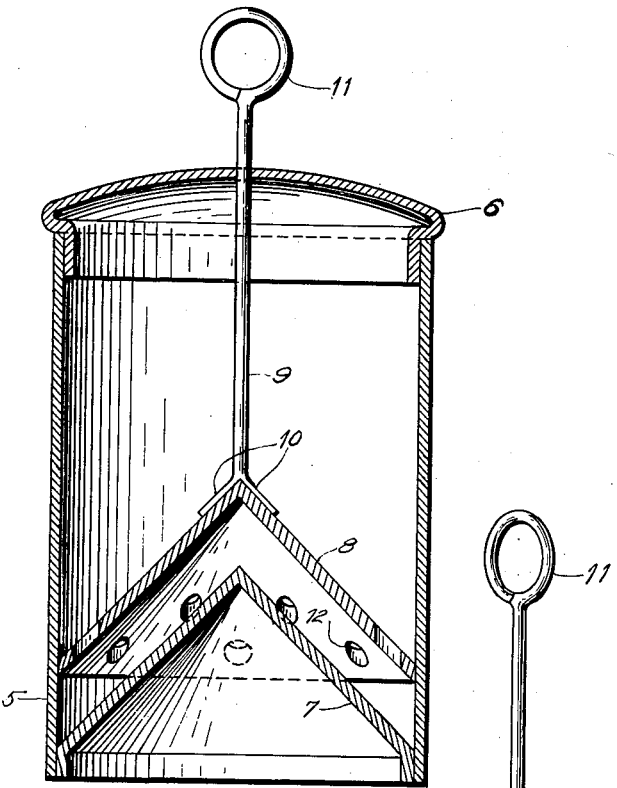
Figure 1 is a central section of my improved beater.

In the drawings 5 is the casing of my improved beater provided with the removable cover 6 and with the conical shaped bottom 7, the latter being soldered to the casing 5, or otherwise secured thereto.

The dasher 8 is also conical in form and preferably of the same angle as the bottom 7.

The handle 9 is provided with wings 10—10 and the latter are soldered, or otherwise secured to the dasher 8. The handle 9 slides freely through a hole provided in the cover 6 and is provided on its top with the ring 11.

The dasher 8 is provided near its edge with a plurality of holes 12. There may be any desired number of holes similar to 12 but it is desirable that there be an imperforate space between the innermost row of holes and the point of the dasher. The purpose of this imperforate portion will be later explained.

Figure 2:
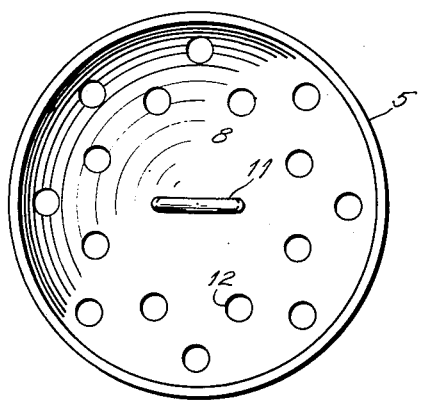
Fig. 2 is a plan view thereof with the cover omitted.
Figure 3:
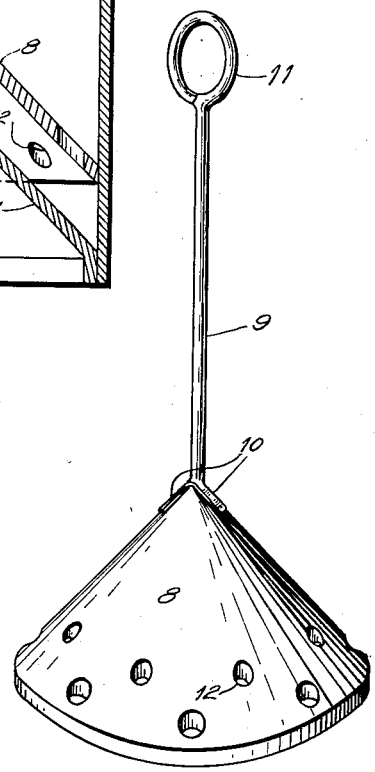
Fig. 3 is a perspective view of the dasher.

The operation of my improved beater is as follows:

The cover 6 and dasher 8 are removed and the eggs or other substances are introduced within the casing 5. The dasher and cover are then placed in position in the casing as shown in Figs. 1 and 2. The hand is then applied to the ring 11 and the dasher 8 moved downwardly. When the dasher 8 is moved downwardly the eggs or other substances are squirted through the holes 12 and the air entrained in the imperforate portion of the dasher is forced through the eggs or other substances and squirted through the holes 12.

The ring 11 is then moved upwardly and the dasher 8 acting like the piston of a pump sucks the eggs or other substances and air through the holes 12.

It is to be understood that the dasher 8 is to be reciprocated rapidly and the squirting and sucking of the eggs or other substances through the holes 12 combined with the interaction of the air rapidly changes them to a foamy consistency.

My improved beater may also be used for mixing liquids.

Thus it will be seen that I provide a simple, cheap and efficient beater in which many changes may be made without departing from the spirit of my invention.

I claim:—

In a beater, the combination with a hollow cylinder, of a bottom having a conical surface directly joining the inner surface of said cylinder, a conical dasher reciprocating in said cylinder, the edges of said dasher having piston-tight engagement with the inner surface of said cylinder, the center of said dasher being imperforate to form an air dome, and perforations in said dasher adjacent said edges.

In testimony whereof, I affix my signature.

WILLIAM MONROE CRANE.